(12) United States Patent
Kondo et al.

(10) Patent No.: US 7,290,328 B2
(45) Date of Patent: Nov. 6, 2007

(54) METHOD OF MANUFACTURING OPTICAL MODULATOR

(75) Inventors: Jungo Kondo, Aichi-pref. (JP); Yukio Mizuno, Komaki (JP); Minoru Imaeda, Nagoya (JP); Atsuo Kondo, Okazaki (JP)

(73) Assignee: NGK Insulators, Ltd., Nagoya (JP)

( * ) Notice: Subject to any disclaimer, the term of this patent is extended or adjusted under 35 U.S.C. 154(b) by 454 days.

(21) Appl. No.: 10/942,562

(22) Filed: Sep. 16, 2004

(65) Prior Publication Data

US 2005/0039322 A1 Feb. 24, 2005

Related U.S. Application Data

(63) Continuation of application No. PCT/JP03/03373, filed on Mar. 19, 2003.

(30) Foreign Application Priority Data

Mar. 19, 2002 (JP) ............... 2002-076216

(51) Int. Cl.
*H01R 43/00* (2006.01)

(52) U.S. Cl. .......... 29/825; 29/592.1; 29/600; 29/830; 359/245; 359/249; 385/2; 385/3; 385/8; 430/15; 430/16; 430/18

(58) Field of Classification Search ............ 29/825, 29/592.1, 600, 830; 359/245, 249; 385/2, 385/3, 8; 430/15, 16, 18
See application file for complete search history.

(56) References Cited

U.S. PATENT DOCUMENTS 5,749,132 A * 5/1998 Mahapatra et al. ........ 29/25.35
5,841,568 A * 11/1998 Miyakawa ................ 359/245
6,400,494 B1   6/2002 Kondo et al. ............. 782/126

(Continued)

FOREIGN PATENT DOCUMENTS

EP   1 079 257 A2   2/2001

(Continued)

OTHER PUBLICATIONS

Yoshinori Kondo et al., "C-3-53 40Gb/s-yo X-cut LiNbO₃ Hikari Henchoki Module", 2002 nen The Institute of Electronics, Information and Communication Engineers Sogo Taikai Koen Ronbunshu, vol. 2002, Electronics 1, Mar. 7, 2002, p. 185 (and Partial English Translation).

(Continued)

*Primary Examiner*—A. Dexter Tugbang
*Assistant Examiner*—Tim Phan
(74) *Attorney, Agent, or Firm*—Burr & Brown (57) ABSTRACT

Major surface of a substrate having an optical waveguide and a modulation electrode is pasted to a base substrate through a thermosetting resin, and then the rear surface of the substrate is machined thus making thin the entirety. Subsequently, the rear surface of the substrate thus rendered thin is subjected to machining or laser machining to form a thin part, which is further subjected to machining or laser machining to form a first thin part at a part, including the optical waveguide, of the thin part and a second thin part thinner than the first thin part contiguously thereto. Thereafter, the rear surface of the substrate is pasted to the major surface of a supporting substrate through a thermosetting resin and the base substrate is stripped thus obtaining an optical modulator.

8 Claims, 11 Drawing Sheets

U.S. PATENT DOCUMENTS

2001/0007601 A1  7/2001  Kondo et al.
2002/0159738 A1  10/2002  Aoki et al. .................... 811/5

FOREIGN PATENT DOCUMENTS

EP        1 109 050         6/2001
EP        1 245 993 A2      10/2002
JP        2001-174766       6/2001

OTHER PUBLICATIONS

Yoshinori Kondo et al., "c-3-3 40Gb/s·2. 8Vx-cut LiNbO3 Uramizo Tsuki Hikari Henchoki", 2001 nen The Institute of Electronics, Information and Communication Engineers Electronics Society Taikai Koen Ronbunshu, vol. 2001, Society CI, Aug. 29, 2001, p. 113 (and Partial English Translation).

Kondo, Jungo et al., "Low-Drive-Voltage 40Gb/s Modulator on X-Cut LiNbO$_3$ Wafer", Proc. 27$^{th}$ Eur. Conf. on Opt. Comm. (ECOC'01—Amsterdam), IEEE, vol. 3, Sep. 30, 2001, pp. 334-335.

Minakata, M., "Recent progress of 40 GHz high-speed LiNbO$_3$ optical modulator", Database Inspec 'Online! The Institution of Electrical Engineers, Stevenage, GB; 2001, Database accession No. 7249239, *abstract*, pp. 1-2.

* cited by examiner

PRIOR ART

FIG. 1

PRIOR ART

METHOD OF MANUFACTURING OPTICAL MODULATOR

CROSS REFERENCE TO RELATED APPLICATIONS

This application is a continuation of International Application No. PCT/JP03/03373 having an international filing date of Mar. 19, 2003, which designated the United States, the entirety of which is incorporated herein by reference.

This application also claims the benefit of Japanese Application 2002-076216, filed Mar. 19, 2002, the entirety of which is incorporated herein by reference.

TECHNICAL FIELD

The present invention relates to a method of manufacturing an optical modulator suitable for use in a high-speed, large-capacity optical fiber communication system or the like.

BACKGROUND ART

In recent years, with the advance of high-speed, large-capacity optical fiber communication systems, high-speed optical modulators using optical waveguide devices, which are typified by external modulators (optical modulators based on the external modulation system), are being put to practical use and widely used in the art.

Figure 1:
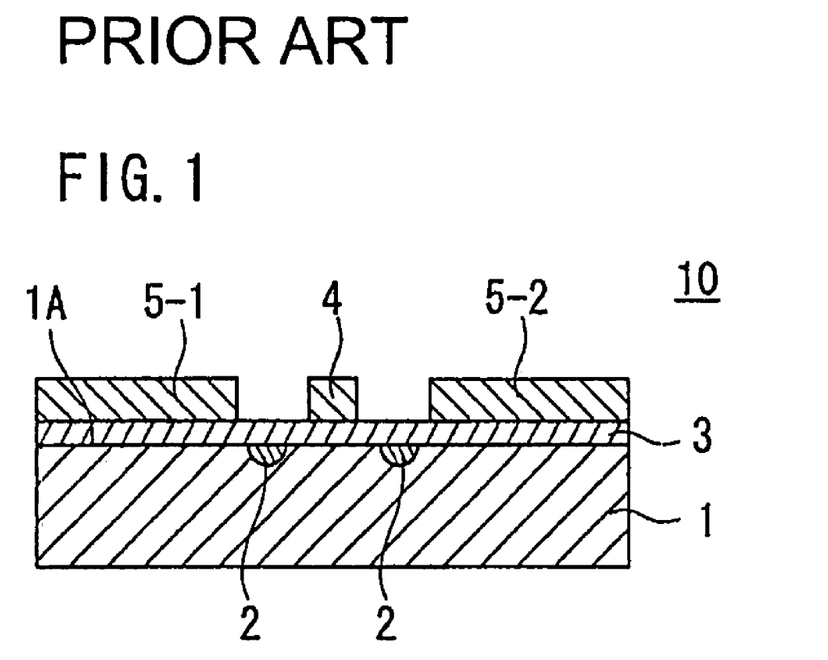
FIG. 1 is a cross-sectional view of a conventional optical modulator.

FIG. 1 is a cross-sectional view of a conventional optical modulator. The optical modulator 10 shown in FIG. 1 has coplanar waveguide (CPW) modulation electrodes for modulating light guided through an optical waveguide. Specifically, the optical modulator 10 comprises a substrate 1 in the form of an X-cut plate of lithium niobate, Mach-Zehnder optical waveguides 2 formed directly beneath a principal surface IA of the substrate 1 by titanium diffusion, a buffer layer 3 of silicon oxide formed on the principal surface IA, and a central electrode 4 and ground electrodes 5-1, 5-2 formed on the buffer layer 3.

Figure 2:
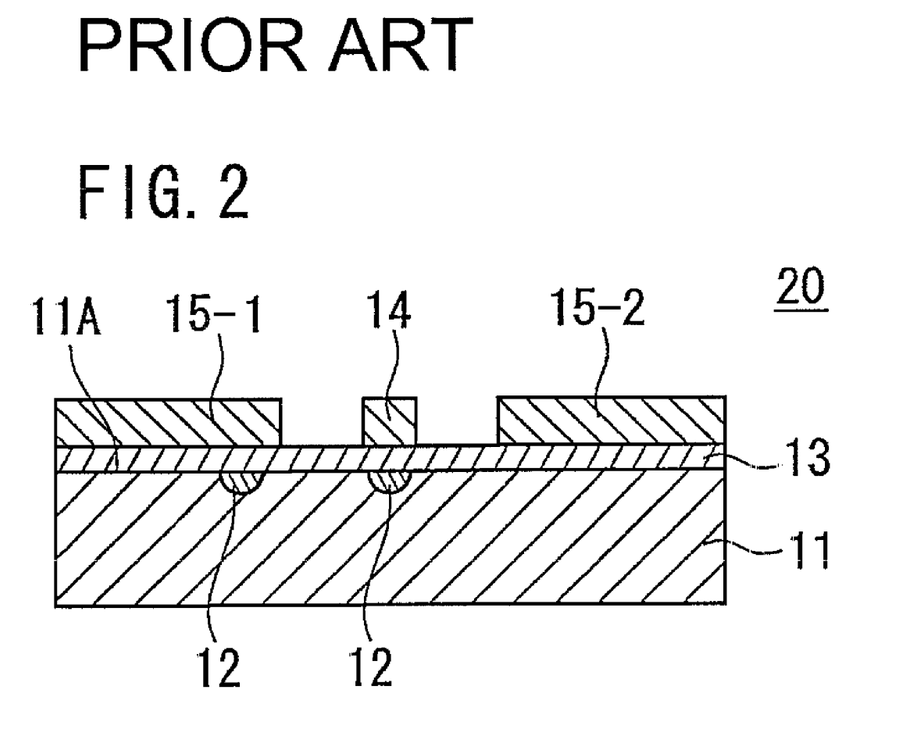
FIG. 2 is a cross-sectional view of another conventional optical modulator.

FIG. 2 is a cross-sectional view of another conventional optical modulator. The optical modulator 20 shown in FIG. 2 has coplanar waveguide (CPW) modulation electrodes for modulating light guided through an optical waveguide. Specifically, the optical modulator 20 comprises a substrate 11 in the form of an Z-cut plate of lithium niobate, Mach-Zehnder optical waveguides 12 formed directly beneath a principal surface 11A of the substrate 11 by titanium diffusion, a buffer layer 13 of silicon oxide formed on the principal surface 11A, and a central electrode 14 and ground electrodes 15-1, 15-2 formed on the buffer layer 13.

In the optical modulators 10, 20 shown in FIGS. 1 and 2, the buffer layers 3, 13 are provided for the purpose of increasing speed matching between the light guided through the optical waveguides 2, 12 and a microwave applied to the modulating electrodes.

However, in the optical modulators 10, 20 shown in FIGS. 1 and 2, the buffer layers 3, 13 included in the substrates 1, 11 are responsible for a DC drift that is produced. Furthermore, since modulation signals are applied from the modulation electrodes through the buffer layers 3, 13 to the light guided through the optical waveguides 2, 12, a substantial modulation signal voltage applied to the light is reduced. For effectively energizing the optical modulators 10, 20, it is necessary to apply a relatively high voltage to the modulation electrodes, despite the demand for reduced drive voltages.

In the optical modulator 20 shown in FIG. 2, since the optical waveguides 12 are positioned asymmetrically with respect to the central electrode 14, the chirp increases, failing to make long-distance transmission.

The present invention provides a method of manufacturing an optical modulator having a novel arrangement which achieves speed matching without a buffer layer and which is free from the above problems.

DISCLOSURE OF THE INVENTION

A method of manufacturing an optical modulator according to the present invention comprises the steps of forming an optical waveguide directly beneath a principal surface of a substrate made of a material having an electro-optic effect, forming modulation electrodes for modulating light guided through the optical waveguide, on the principal surface of the substrate, applying the principal surface of the substrate to a base substrate with the modulation electrodes interposed therebetween, performing a first machining process on a reverse side of the substrate while the base substrate is fixed in position, thereby processing the substrate in its entirety into a thin plate, performing a second machining process on the reverse side of the substrate, which is processed into a thin plate, to process a portion of the substrate which includes the optical waveguide into a thin-wall portion, performing a third machining process on the thin-wall portion of the substrate to process the portion of the substrate which includes the optical waveguide into a first thin-wall portion and to process a portion adjacent to the first thin-wall portion into a second thin-wall portion which is thinner than the first thin-wall portion, and applying the reverse side of the substrate to a principal surface of a support substrate, and thereafter removing the base substrate from the substrate (first manufacturing method).

A method of manufacturing an optical modulator according to the present invention comprises the steps of forming an optical waveguide directly beneath a principal surface of a substrate made of a material having an electro-optic effect, forming modulation electrodes for modulating light guided through the optical waveguide, on the principal surface of the substrate, applying the principal surface of the substrate to a base substrate with the modulation electrodes interposed therebetween, performing a first machining process on a reverse side of the substrate while the base substrate is fixed in position, thereby processing the substrate in its entirety into a thin plate, performing a second machining process on the reverse side of the substrate which is processed into a thin plate to process a portion of the substrate which includes the optical waveguide into a thin-wall portion, performing a laser machining process on the thin-wall portion of the substrate to process the portion of the substrate which includes the optical waveguide into a first thin-wall portion and to process a portion adjacent to the first thin-wall portion into a second thin-wall portion which is thinner than the first thin-wall portion, and applying the reverse side of the substrate to a principal surface of a support substrate, and thereafter removing the base substrate from the substrate (second manufacturing method).

A method of manufacturing an optical modulator according to the present invention comprises the steps of forming an optical waveguide directly beneath a principal surface of a substrate made of a material having an electro-optic effect, forming modulation electrodes for modulating light guided through the optical waveguide, on the principal surface of the substrate, applying the principal surface of the substrate to a base substrate with the modulation electrodes interposed therebetween, performing a first machining process on a reverse side of the substrate while the base substrate is fixed in position, thereby processing the substrate in its entirety into a thin plate, performing a laser machining process on the reverse side of the substrate which is processed into a thin plate to process a portion of the substrate which includes the optical waveguide into a thin-wall portion, performing a second machining process on the thin-wall portion of the substrate to process the portion of the substrate which includes the optical waveguide into a first thin-wall portion and to process a portion adjacent to the first thin-wall portion into a second thin-wall portion which is thinner than the first thin-wall portion, and applying the reverse side of the substrate to a principal surface of a support substrate, and thereafter removing the base substrate from the substrate (third manufacturing method).

A method of manufacturing an optical modulator according to the present invention comprises the steps of forming an optical waveguide directly beneath a principal surface of a substrate made of a material having an electro-optic effect, forming modulation electrodes for modulating light guided through the optical waveguide, on the principal surface of the substrate, applying the principal surface of the substrate to a base substrate with the modulation electrodes interposed therebetween, performing a machining process on a reverse side of the substrate while the base substrate is fixed in position, thereby processing the substrate in its entirety into a thin plate, performing a first laser machining process on the reverse side of the substrate which is processed into a thin plate to process a portion of the substrate which includes the optical waveguide into a thin-wall portion, performing a second laser machining process on the thin-wall portion of the substrate to process the portion of the substrate which includes the optical waveguide into a first thin-wall portion and to process a portion adjacent to the first thin-wall portion into a second thin-wall portion which is thinner than the first thin-wall portion, and applying the reverse side of the substrate to a principal surface of a support substrate, and thereafter removing the base substrate from the substrate (fourth manufacturing method).

The inventors have succeeded in developing an optical modulator having a novel arrangement which is capable of achieving speed matching without a buffer layer and reducing a coupling loss that is caused when an optical fiber is coupled.

Figure 3:
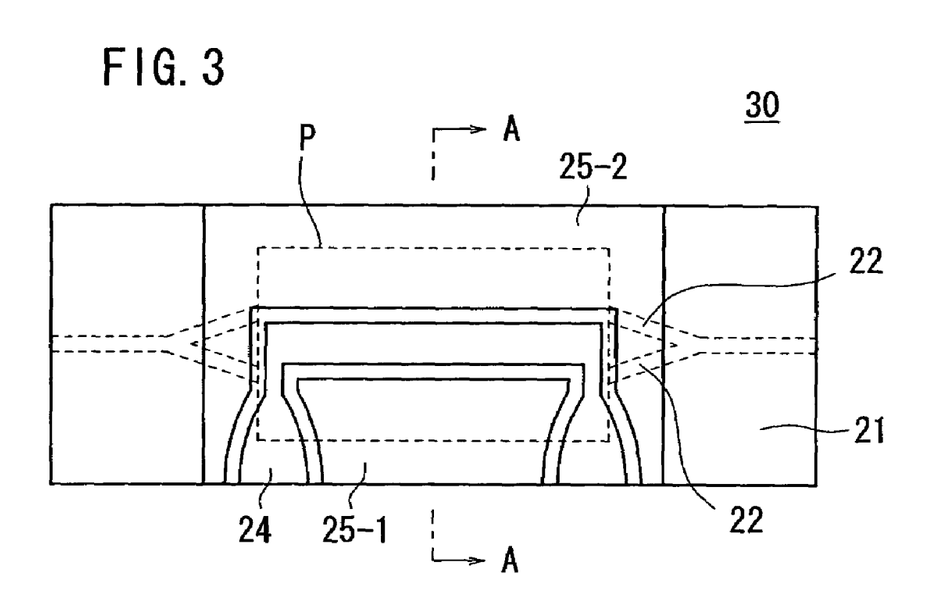
FIG. 3 is a plan view of an optical modulator produced by a manufacturing method according to the present invention.
Figure 4:
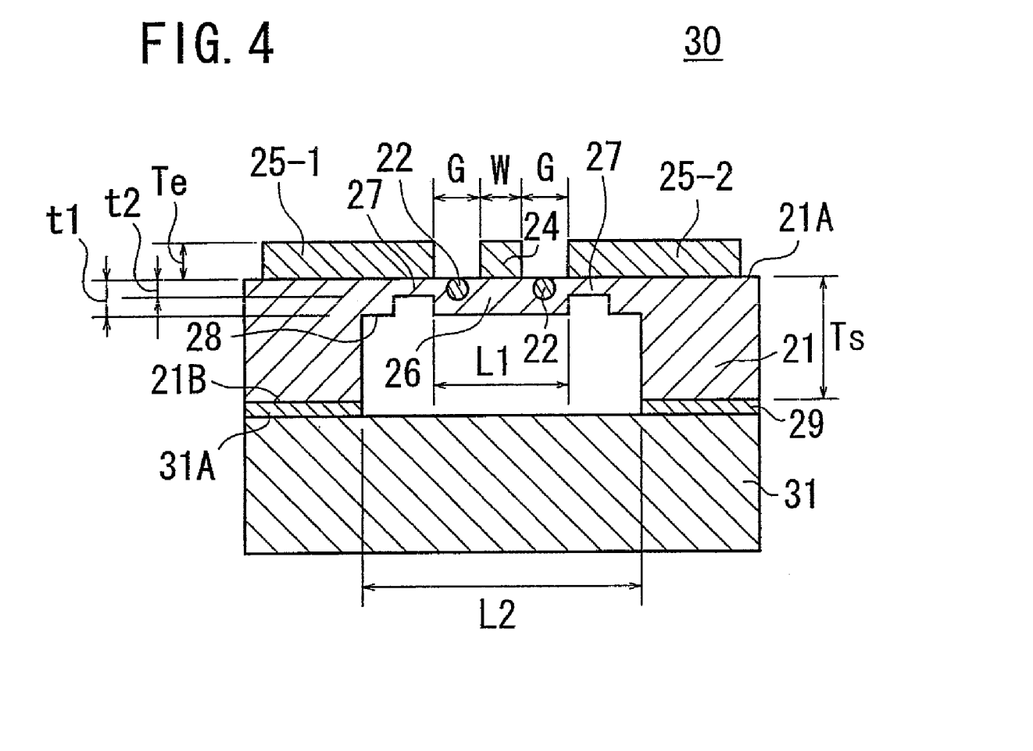
FIG. 4 is a cross-sectional view taken along line A-A of FIG. 3.

FIG. 3 is a plan view of a novel optical modulator manufactured by a manufacturing method according to the present invention, and FIG. 4 is a cross-sectional view taken along line A-A of FIG. 3. The optical modulator 30 shown in FIGS. 3 and 4 comprises a thin substrate 21 made of a material having an electro-optic effect, such as lithium niobate, Mach-Zehnder optical waveguides 22 formed in the substrate 21 near a principal surface 21A thereof, and a central electrode 24 and ground electrodes 25-1, 25-2 formed on the substrate 21. The central electrode 24 and the ground electrodes 25-1, 25-2 serve as CPW modulation electrodes for modulating light guided through optical waveguides 22.

The reverse side of the substrate 21 is processed to provide a first thin-wall portion 26 formed in a region including the optical waveguides 22, and second thin-wall portions 27 formed adjacent to the first thin-wall portion 26, the second thin-wall portions 27 being thinner than the first thin-wall portion 26. The first thin-wall portion 26 has an end face (reverse side) positioned directly beneath the optical waveguides 22.

Since modulation signals from the modulation electrodes seep into a low-dielectric-constant region (air) that is present below the second thin-wall portion 27, speed matching conditions can be satisfied without forming a buffer layer. Furthermore, because the modulation signals are effectively applied to the optical waveguides 22, a drive voltage applied to the optical modulator 30 is lowered.

Of the substrate 21, the first thin-wall portion 26 formed in the region including the optical waveguides 22 has a thickness t1 greater than the thickness t2 of the second thin-wall portions 27 formed adjacent to the first thin-wall portion 26. Therefore, the optical waveguides 22 have a cross-sectional shape prevented from being flattened. Consequently, when light is applied, any reduction in a coupling loss with respect to a region where the first and second thin-wall portions 26, 27 are not formed is prevented.

The first and second thin-wall portions 26, 27 should preferably be formed coextensively with a region P shown in FIG. 3. The region P is a region where light guided through the optical waveguides 22 and modulation signals from the modulation electrodes substantially coact with each other, and a region indicated by the broken lines where the optical waveguides 22, the central electrode 24, and the ground electrodes 25-1, 25-2 extend substantially parallel to each other. The first thin-wall portion 26 and the second thin-wall portion 27 may be formed so as to include the region P and extend entirely along the optical waveguides 22 of the substrate 21.

In the optical modulator 30 shown in FIGS. 3 and 4, since the substrate 21 is thin and has the first thin-wall portion 26 and the second thin-wall portion 27, the substrate 21 may not be of sufficient mechanical strength. Therefore, a support substrate 31 made of lithium niobate or the like is applied to a reverse side 21B of the substrate 21.

Figure 5:
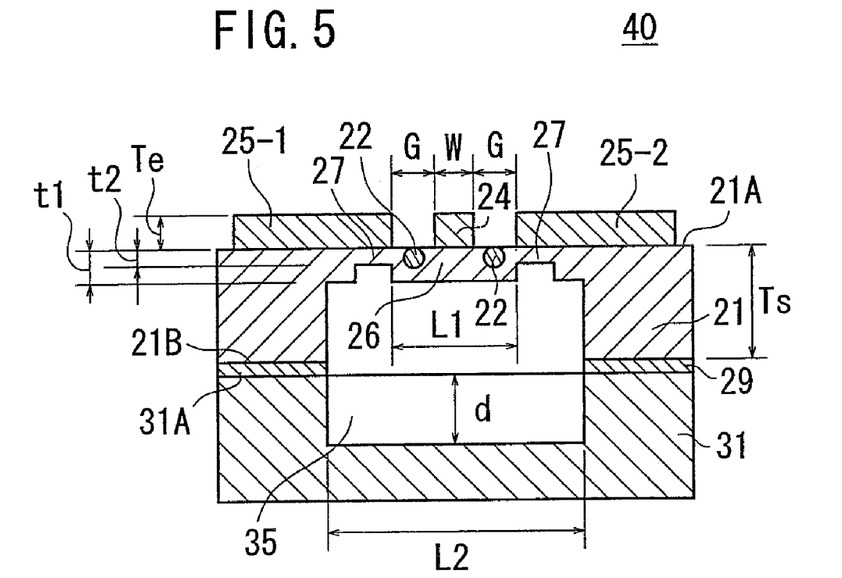
FIG. 5 is a plan view of another optical modulator produced by the manufacturing method according to the present invention.

FIG. 5 is a cross-sectional view of a modification of the optical modulator shown in FIGS. 3 and 4. An optical modulator 40 shown in FIG. 5 is basically of the same structure as the optical modulator 30 shown in FIGS. 3 and 4, but differs therefrom in that a groove 35 is defined in the support substrate 31, and the reverse side 21B of the substrate 21 is applied to a principal surface 31A of the support substrate 31 such that the optical waveguides 22, the first thin-wall portion 26, and the second thin-wall portions 27 are positioned within the groove 35.

With the optical modulator 40 shown in FIG. 5, in addition to the first thin-wall portion 26 and the second thin-wall portion 27, a cavity formed by the groove 35 is present below the first thin-wall portion 26 and the second thin-wall portion 27. Consequently, modulation signals from the modulation electrodes do not leak out of the substrate 21, but are efficiently applied intensively to the optical waveguides 22. Therefore, the effective applied voltage of the modulation signals is increased, thus further reducing the drive voltage of the optical modulator 40. The groove 35 has a depth d of 1 µm or more and preferably in the range from 10 µm to 200 µm.

In the optical modulator 30 shown in FIGS. 3 and 4 and the optical modulator 40 shown in FIG. 5, it is preferable to produce the substrate 21 as a thin plate from a substrate material having a thickness of some millimeters until the thickness Ts thereof is in the range from about 50 µm to 300 µm. The first thin-wall portion 26 has a small thickness ti in the range from about 15 µm to 50 µm, and the second thin-wall portions 27 have a small thickness t2 of 12.5 µm or less. However, machining techniques for producing thin plates and thin-wall portions are not yet sufficiently established, and the yield of such optical modulators is extremely low.

The inventors have made intensive studies to establish machining techniques for realizing the above structures and to find a method of stably producing the optical modulators 30, 40 shown in FIGS. 3 and 4 and FIG. 5. As a result, the inventors have invented the first manufacturing method through the fourth manufacturing method described above, i.e., have found that after a substrate material is applied to a base substrate, the base substrate is fixed, the substrate material is machined into a substrate as a thin plate, and thin-wall portions are produced by machining or laser processing, resulting in an increase in the yield of optical modulators.

BEST MODE FOR CARRYING OUT THE INVENTION

Embodiments of a method of manufacturing an optical modulator according to the present invention will be described below with reference to FIGS. 6 through 11.

FIGS. 6 through 10 are cross-sectional views showing the manufacturing steps of the manufacturing method according to the first embodiment. In actual manufacturing steps, a plurality of optical modulators are simultaneously fabricated on a wafer (substrate) having a predetermined size. In the description which follows, however, one optical modulator fabricated on the wafer will be described.

Figure 6:
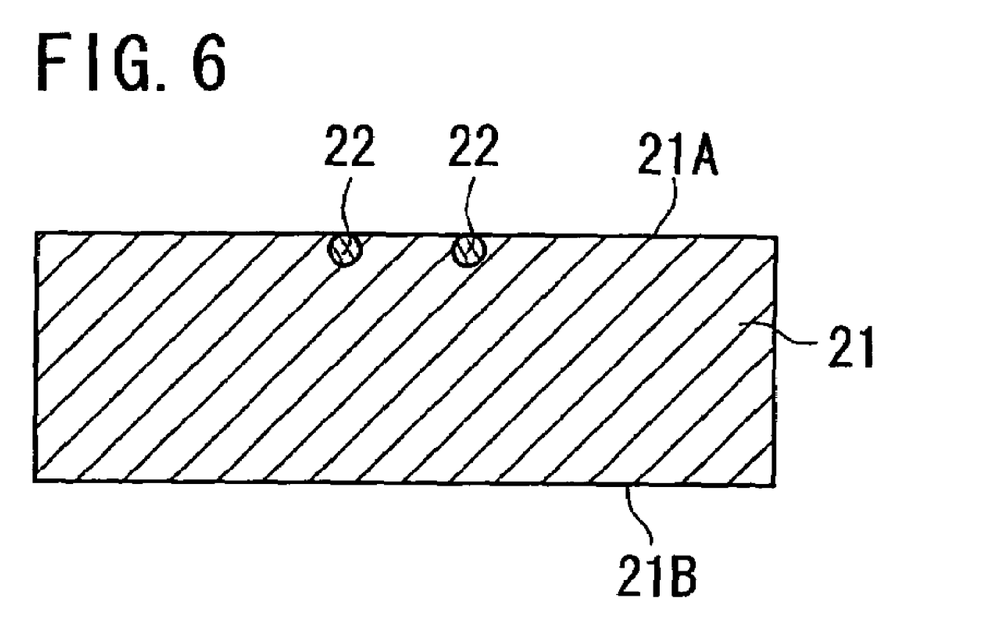
FIG. 6 is a process diagram showing a state in which optical waveguides are formed in a substrate.

First, the manufacturing method according to the first embodiment will be described below. As shown in FIG. 6, after a predetermined mask pattern is formed on a principal surface 21A of a substrate 21 which is made of a material having an electro-optic effect, such as lithium niobate, Mach-Zehnder optical waveguides 22 are fabricated directly beneath the principal surface 21A by titanium diffusion or the like.

Figure 7:
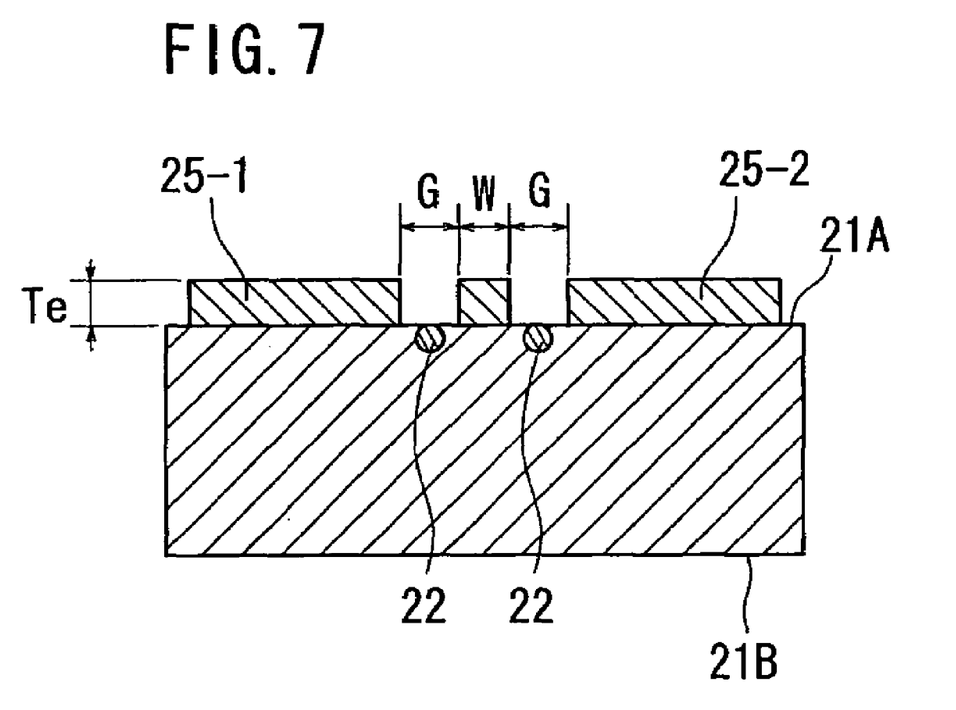
FIG. 7 is a process diagram showing a state in which CPW modulation electrodes are formed on the substrate.

Then, as shown in FIG. 7, a predetermined mask pattern is formed on the principal surface 21A of the substrate 21, and CPW modulation electrodes comprising a central electrode 24 and ground electrodes 25-1, 25-2 are fabricated by plating or a combination of evaporation and plating.

The central electrode 24 and the ground electrodes 25-1, 25-2 have a thickness Te preferably in the range from 15 μm to 50 μm, and the central electrode 24 has a width W preferably in the range from 5 μm to 50 μm, for thereby reducing an electrode loss of modulation signals. Gaps G between the central electrode 24 and the ground electrodes 25-1, 25-2 should preferably in the range from 25 μm to 55 μm for thereby suppressing an increase in the drive voltage and also effectively modulating light that is guided through the optical waveguides 22.

Figure 8:
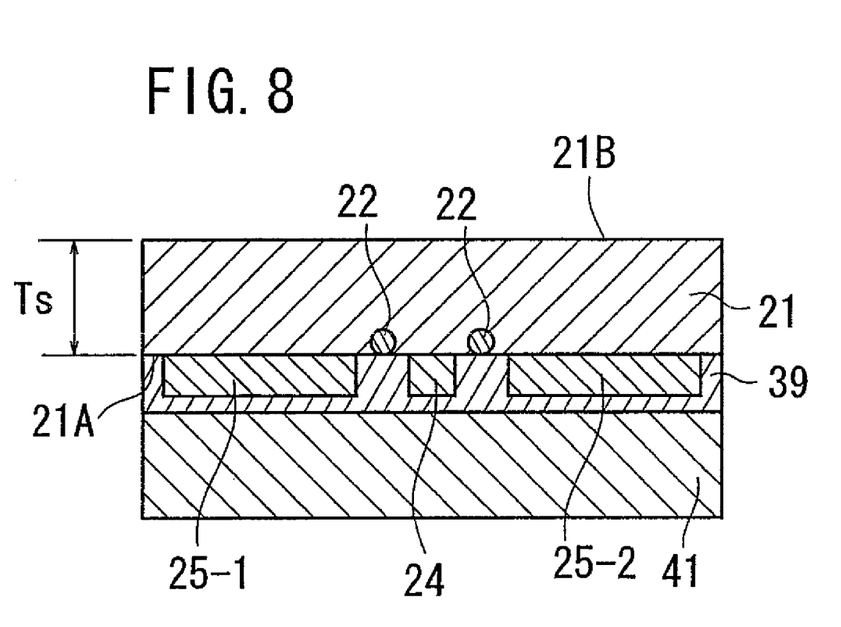
FIG. 8 is a process diagram showing a state in which a principal surface of the substrate is applied to a base substrate by a thermoplastic resin interposed therebetween, and the base substrate is fixed to the level block of a polishing machine by a thermoplastic resin.

Then, as shown in FIG. 8, the principal surface 21A of the substrate 21 is applied to a base substrate 41 by a thermoplastic resin 39 interposed therebetween, and the base substrate 41 is fixed to the level block of a polishing machine or the like by a thermoplastic resin. Then, the reverse side 21B of the substrate 21 is subjected to a polishing process as a first machining process until the substrate 21 is polished to a thin plate having a thickness Ts. As described above, the thickness Ts of the substrate 21 is in the range from 30 μm to 300 μm. The polishing process comprises a lateral polishing process, a high-speed lapping process, and a chemical polishing process (CMP).

Figure 9:
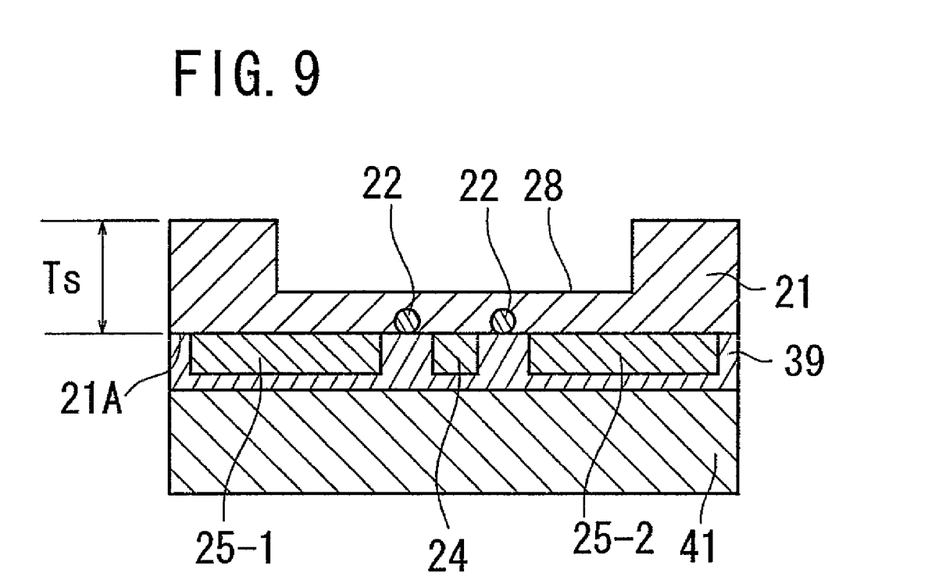
FIG. 9 is a process diagram showing a state in which the reverse side of the substrate is processed by a second machining process to turn the substrate into a thin plate with a thin-wall portion formed therein.
Figure 10:
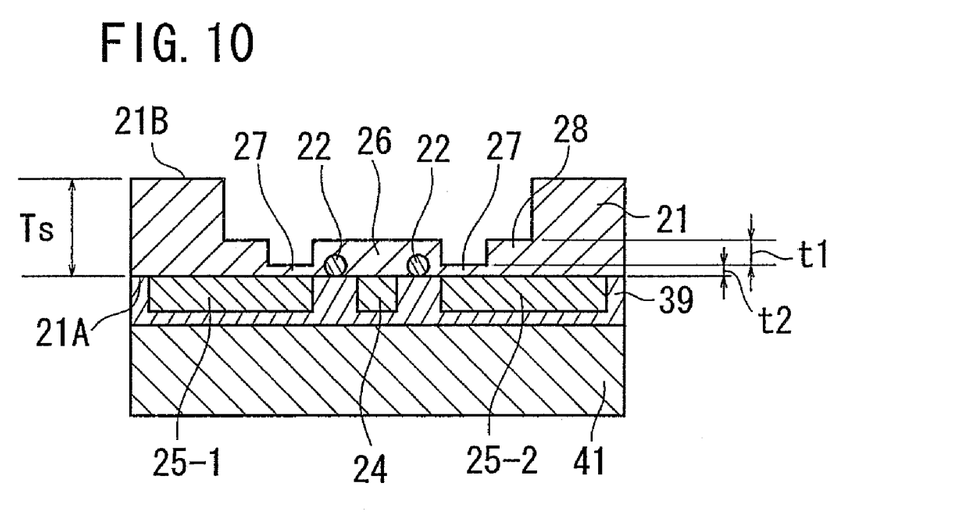
FIG. 10 is a process diagram showing a state in which the thin-wall portion is processed by a third machining process to form first and second thin-wall portions.

Then, as shown in FIG. 9, a reverse side 21B of the substrate 21 is subjected to a second machining process to form a thin-wall portion 28. Of the thin-wall portion 28, regions except regions including the optical waveguides 22 are subjected to a third machining process to form a first thin-wall portion 26 including the optical waveguides 22 and second thin-wall portions 27 disposed adjacent to the first thin-wall portion 26 and thinner than the first thin-wall portion 26, as shown in FIG. 10. Those regions of the first and second thin-wall portions 26, 27 which correspond to portions other than the CPW electrodes are not machined. Therefore, since the first and second thin-wall portions 26, 27 are covered with a thick substrate portion, their mechanical strength is maintained.

The first machining process and the second machining process are performed after the base substrate 41 is fixedly applied by a thermoplastic resin to the level block of a grinding machine such as a microgrinder, sand blaster, or the like.

The first thin-wall portion 26 has a thickness t1 preferably in the range from 5 μm to 30 μm for preventing the optical waveguides 22 from being flattened to suppress an increase in the coupling loss that is caused when an optical fiber is coupled and to effectively apply modulating signals from the modulation electrodes to light guided through the optical waveguides 22. For the same reasons, the first thin-wall portion 26 has a width L preferably in the range from (W+2 μm) to (W+2G) where W is the width of the central electrode 24 and G is the gap between the first and second thin-wall portions 26, 27.

The second thin-wall portions 27 have a thickness t2 required to be smaller than the thickness t1 of the first thin-wall portion, preferably to meet the relationship $t1-t2 \geq 1$ μm, for thereby effectively applying modulating signals from the modulation electrodes to light guided through the optical waveguides 22.

The reverse side 21B of the substrate 21 and the principal surface 31A of the support substrate 31 are applied to each other by a thermoplastic resin such as epoxy film interposed therebetween, fabricating the optical modulator 30 shown in FIGS. 3 and 4 or the optical modulator 40 shown in FIG. 5. If the optical modulator 40 shown in FIG. 5 is fabricated, then the groove 35 is defined in the principal surface 31A of the support substrate 31, and the substrate 21 and the support substrate 31 are applied to each other such that the optical waveguides 22, the first thin-wall portion 26, and the second thin-wall portions 27 are positioned within the groove 35. Thereafter, the base substrate 41 is removed from the substrate 21.

As described above, the second machining process and the third machining process include a grinding process using a microgrinder. The outer circumferential blade of the microgrinder tends to be deformed and has its grinding surface suffering surface irregularities which are liable to introduce variations in the substrate thickness. Therefore, during the grinding process, it is preferable to perform, from time to time, truing on the grinding surface to keep the outer circumferential blade in shape. Since the shape of the outer circumferential blade reflects the surface accuracy of the truing tool, the truing tool should preferably be made of a material that has surface roughness or planarity that satisfies prescribed conditions and is harder than the outer circumferential blade of the microgrinder.

Figure 11:
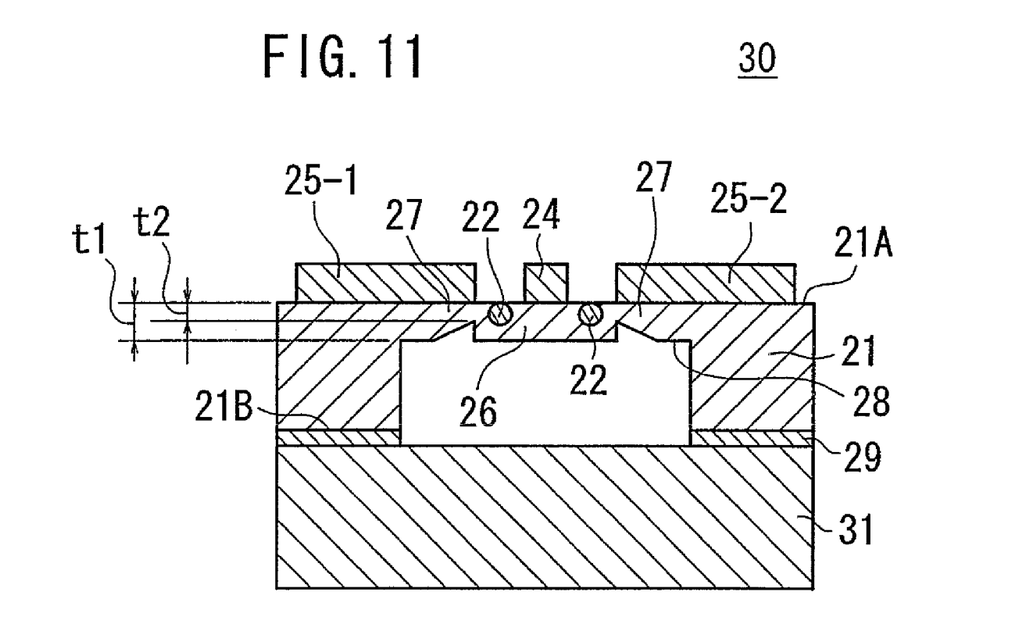
FIG. 11 is a cross-sectional view of a modification of the optical modulators shown in FIGS. 3 and 4.

In the case where the second machining process and the third machining process include the above grinding process, the particle size and shape of the abrasive grain of the outer circumferential blade that is used may be selected appropriately. For example, as shown in FIG. 11, a wedge-shaped blade may be used in the second machining process to form wedge-shaped second thin-wall portions 27. In this case, the thickness of the tip ends of the wedge-shaped second thin-wall portions, i.e., the smallest thickness thereof, is represented by t2. The second thin-wall portions 27 thus formed are effective to prevent the substrate 21 from cracking and also to increase the mechanical strength of the substrate 21 and the mechanical strength of the optical modulator 30.

A manufacturing method according to a second embodiment will be described below. According to the second embodiment, the assembly of the optical modulator 30 is basically fabricated by the process shown in FIGS. 6 through 10, except as follows:

As shown in FIG. 9, after the thin-wall portion 28 is fabricated by a machining process which is the same as the second machining process described above, regions except regions including the optical waveguides 22 are subjected to a laser machining process to form a first thin-wall portion 26 including the optical waveguides 22 and second thin-wall portions 27 disposed adjacent to the first thin-wall portion 26 and thinner than the first thin-wall portion 26. Those regions of the first and second thin-wall portions 26, 27 which correspond to portions other than the CPW electrodes are not machined.

The laser machining process may be performed using an excimer laser having a pulse duration of 10 nsecs. or less, with an irradiation intensity set to a value in the range from 1 mJ to 2 mJ. The first thin-wall portion 26 and the second thin-wall portions 27 can thus be formed highly accurately in a relative short period of time.

Thereafter, as described above, the reverse side 21B of the substrate 21 and the principal surface 31A of the support substrate 31 are applied to each other by a thermoplastic resin such as epoxy film interposed therebetween, fabricating the optical modulator 30 shown in FIGS. 3 and 4 or the optical modulator 40 shown in FIG. 5.

The machining process used to form the thin-wall portion 28 shown in FIG. 9 is performed after the base substrate 41 is fixedly applied by a thermoplastic resin to the level block of a grinding machine such as a microgrinder, sand blaster, or the like. The roughness and width of the blade used in the grinding process are selected appropriately.

The machining process includes a grinding process using a microgrinder or the like. It is preferable to perform, from time to time, truing on the grinding surface to keep the outer circumferential blade in shape.

The dimensions required on the optical modulator 30 including the substrate 21 as a thin plate and the first thin-wall portion 26 and the second thin-wall portions 27 are the same as those in the first manufacturing process.

A manufacturing method according to a third embodiment will be described below. According to the third embodiment, the assembly of the optical modulator 30 is basically fabricated by the process shown in FIGS. 6 through 10, except as follows:

The thin-wall portion 28 shown in FIG. 9 is fabricated by a laser machining process instead of the grinding process described above. The laser machining process may be performed using an excimer laser, with an irradiation intensity set to a value in the range from 1.0 J/cm$^2$ to 8.0 J/cm$^2$. The thin-wall portion 28 can thus be formed highly accurately in a relative short period of time.

Then, the thin-wall portion 28 is subjected to a machining process which is the same as the second machining process in the manufacturing process according to the first embodiment to form a first thin-wall portion 26 including the optical waveguides 22 and second thin-wall portions 27 disposed adjacent to the first thin-wall portion 26 and thinner than the first thin-wall portion 26, as shown in FIG. 10. In the first thin-wall portion 26, end faces directly beneath the optical waveguides 22 are not machined.

The machining process is performed after the base substrate 41 is fixedly applied by a thermoplastic resin to the level block of a grinding machine such as a microgrinder, sand blaster, or the like. The roughness and width of the blade used in the grinding process are selected appropriately. For example, a wedge-shaped blade may be used to form wedge-shaped second thin-wall portions 27, as shown in FIG. 11.

The machining process includes a grinding process using a microgrinder or the like, in the same manner as described above. It is preferable to perform, from time to time, truing on the grinding surface to keep the outer circumferential blade in shape.

The dimensions required on the optical modulator 30 including the substrate 21 as a thin plate and the first thin-wall portion 26 and the second thin-wall portions 27 are the same as those in the first manufacturing process.

A manufacturing method according to a fourth embodiment will be described below. According to the fourth embodiment, the assembly of the optical modulator 30 is basically fabricated by the process shown in FIGS. 6 through 10, except as follows:

The thin-wall portion 28 shown in FIG. 9 is fabricated by a first laser machining process instead of the grinding process described above. The first thin-wall portion 26 and the second thin-wall portions 27 are fabricated by a second laser machining process performed on the thin-wall portion 28.

The first laser machining process may be performed using an excimer laser, with an irradiation intensity set to a value in the range from 1.0 J/cm² to 8.0 J/cm². The thin-wall portion 28 can thus be formed highly accurately in a relative short period of time.

The second laser machining process may be performed using an excimer laser having a pulse duration of 10 nsecs. or less, with an irradiation intensity set to a value in the range from 1 mJ to 2 mJ. The first thin-wall portion 26 and the second thin-wall portions 27 can thus be formed highly accurately in a relative short period of time.

The dimensions required on the optical modulator 30 including the substrate 21 as a thin plate and the first thin-wall portion 26 and the second thin-wall portions 27 are the same as those in the first manufacturing process.

EXAMPLE 1

In the present example, the optical modulator shown in FIGS. 3 and 4 was fabricated according to the process shown in FIGS. 6 through 10 based on the first manufacturing process. An X-cut plate of lithium niobate having a thickness of 0.5 mm was used as the substrate 21, and the Mach-Zehnder optical waveguides 22 were formed in the substrate 21 near the principal surface 21A thereof by titanium diffusion, as shown in FIG. 6. Then, as shown in FIG. 7, the CPW modulation electrodes were fabricated on the principal surface 21A by plating. The central electrode 24 had a width W of 30 μm, the gaps G between the central electrode 24 and the ground electrodes 25-1, 25-2 were each of 40 μm, and the electrodes had a thickness Te of 30 μm and a length of 40 mm.

Then, as shown in FIG. 8, the base substrate 31 of lithium niobate was applied to the principal surface 21A of the substrate 21 by a thermoplastic resin. Thereafter, the reverse side 21B of the substrate 21 was polished by a lateral polishing process, a high-speed lapping process, and a polishing process (CMP) to turn the substrate 21 into a thin plate until it has a thickness Ts=100 μm. The thickness of the substrate was measured by a shape measuring unit.

Then, a resin-bonded blade of #6000 having a width of 100 μm was used to perform a first machining process on the reverse side 21B of the substrate 21, forming the thin-wall portion 28 shown in FIG. 9. The blade had a rotational speed of 12000 rpm. In the thickness direction and the plane direction (the direction substantially parallel to the reverse side of the substrate 21), the substrate was ground 1 μm from the surface thereof at a rate of 0.1 mm/min. in the thickness direction of the substrate, and then slotted at a rate of 20 mm/min. in the horizontal direction (in the direction of the electrode length) from that position. The above process was repeated to machine the substrate.

In the first machining process, truing was performed, using a grinding wheel of #1500 each time the substrate was machined 100 μm in the thickness direction.

Then, a resin-bonded blade of #6000 having a width of 100 μm was used to perform a second machining process on the thin-wall portion 28 to form the first thin-wall portion 26 and the second thin-wall portions 27, as shown in FIG. 10. The first thin-wall portion 26 had a width L of 90 μm and a thickness t1 of 15 μm, and the second thin-wall portions 27 had a thickness t2 of 10 μm. The thicknesses of these thin-wall portions were measured by a shape measuring unit.

Then, the reverse side 21B of the substrate 21 and the support substrate 31 of lithium niobate having a thickness of 0.3 mm were applied to each other by epoxy film, and the base substrate 41 is removed. The assembly thus obtained was cut into a chip, producing the optical modulator 30 shown in FIGS. 3 and 4.

An optical fiber was bonded to the optical modulator 30 by an UV-curable resin, and the packaged optical modulator was evaluated for S21 characteristics. As a result, the −6 dB band was 40 GHz and over, and the microwave effective refractive index nm was 2.15. The evaluated optical response for −3 dB was 40 GHz and over. The coupling loss was 5 dB.

EXAMPLE 2

The optical modulator 30 was fabricated in the same manner as Example 1 except that the second machining process was performed using a wedge-shaped blade to form the wedge-shaped second thin-wall portions 27 shown in FIG. 11. The second thin-wall portions 27 had a thickness t2 of 10 μm, as with Example 1. The optical modulator 30 had the same S21 characteristics, optical response, and coupling loss as those of Example 1.

EXAMPLE 3

The optical modulator 30 was fabricated in the same manner and of the same dimensions as Example 1 except that a laser machining process, instead of the second machining process, was performed on the thin-wall portion 28, and the first thin-wall portion 26 and the second thin-wall portions 27 were formed according to the second manufacturing method. The laser machining process was performed using a KrF excimer laser having a frequency of 120 Hz, with an irradiation intensity of 2 mJ and a scanning speed of 300 μm/sec. The optical modulator 30 had the same S21 characteristics, optical response, and coupling loss as those of Example 1.

EXAMPLE 4

The optical modulator 30 was fabricated in the same manner and of the same dimensions as Example 1 except that a laser machining process, instead of the first machining process, was performed on the reverse side 21B of the substrate 21, and the thin-wall portion 28 was fabricated according to the third manufacturing method. The laser machining process was performed using a KrF excimer laser having a frequency of 195 Hz, with an irradiation intensity of 6.8 J/cm² and a scanning speed of 1800 μm/sec. After the substrate 21 was machined until its thickness reaches 100 μm, it was machined with an irradiation intensity of 3.8 J/cm² and a scanning speed of 1800 μm/sec. until its thickness reaches 15 μm. The optical modulator 30 had the same S21 characteristics, optical response, and coupling loss as those of Example 1.

EXAMPLE 5

The optical modulator 30 was fabricated in the same manner and of the same dimensions as Example 1 except that a first laser machining process, instead of the first machining process, was performed to form the thin-wall portion 28, a second laser machining process, instead of the second machining process, was performed on the thin-wall portion 28, and the first thin-wall portion 26 and the second thin-wall portions 27 were formed according to the fourth manufacturing method. The first laser machining process was performed using a KrF excimer laser having a frequency of 195 Hz, with an irradiation intensity of 6.8 J/cm² and a scanning speed of 1800 μm/sec. After the substrate 21 was machined until its thickness reaches 100 μm, it was machined with an irradiation intensity of 3.8 J/cm² and a scanning speed of 1800 µm/sec. until its thickness reaches 15 µm. The second laser machining process was performed using a KrF excimer laser having a pulse duration of 4 nsecs. and a frequency of 120 Hz, with an irradiation intensity of 2 mJ and a scanning speed of 300 µm/sec. The optical modulator 30 had the same S21 characteristics, optical response, and coupling loss as those of Example 1.

EXAMPLE 6

The optical modulator 40 shown in FIG. 5 was fabricated. The thin-wall portion 28, the first thin-wall portion 26, and the second thin-wall portions 27 were formed to the same dimensions by the same first and second laser machining processes as those in Example 5. Thereafter, the substrate 21 as a thin plate and the support substrate 31 having the groove 35 defined in the principal surface thereof and having a depth d of 0.05 mm and a width L2 of 0.3 mm were applied to each other by epoxy film. The reverse side 21B of the substrate 21 and the principal surface 31A of the support substrate 31 were applied to each other such that the optical waveguides 22, the first thin-wall portion 26, and the second thin-wall portions 27 are positioned within the groove 35.

The assembly thus obtained was cut into a chip, producing the optical modulator 40 shown in FIG. 5. An optical fiber was bonded to the optical modulator 40 by an UV-curable resin, and the packaged optical modulator was evaluated for S21 characteristics. As a result, the −6 dB band was 40 GHz and over, and the microwave effective refractive index nm was 2.15. The evaluated optical response for −3 dB was 40 GHz and over. The coupling loss was 5 dB.

While the present invention has been described in detail according to the embodiments thereof with respect to the specific examples, the present invention is not limited to the above details, but any alterations and modifications may be made without departing from the scope of the present invention.

For example, the substrate 21 comprises an X-cut plate of lithium niobate in the above embodiments. However, the substrate 21 may comprise a Y-cut plate, a Z-cut plate, or an off-cut plate. Lithium niobate may be replaced with a known material having an electro-chemical effect such as lithium tantalate. Elements such as Mg, Zn, Sc, and In may be added to the substrate 21 to increase optical damage resistance thereof.

A polishing process, if necessary, may be included in addition to the grinding process and the laser machining process. The optical waveguides 22 may be formed by proton exchange, rather than titanium diffusion.

INDUSTRIAL APPLICABILITY

According to the present invention, as described above, a substrate can be processed into a thin plate highly accurately, and a first thin-wall portion and second thin-wall portions can be formed stably and highly accurately in the reverse side of the substrate in the form of a thin plate. Therefore, an optical modulator can be fabricated which can achieve speed matching without a buffer layer and is excellent as to a coupling loss.

The invention claimed is:

1. A method of manufacturing an optical modulator, comprising the steps of:
   forming an optical waveguide directly beneath a principal surface of a substrate made of a material having an electro-optic effect;
   forming modulation electrodes for modulating light guided though said optical waveguide, on said principal surface of said substrate;
   applying said principal surface of said substrate to a base substrate with said modulation electrodes interposed therebetween;
   performing a first machining process on a reverse side of said substrate while said base substrate is being fixed in position, thereby processing said substrate in its entirety into a thin plate;
   performing a second machining process on said reverse side of said substrate which is processed into a thin plate to process a portion of said substrate which includes said optical waveguide into a thin-wall portion;
   performing a laser machining process on said thin-wall portion of said substrate to process said portion of said substrate which includes said optical waveguide into a first thin-wall portion and to process a portion adjacent to said first thin-wall portion into a second thin-wall portion which is thinner than said first thin-wall portion; and
   applying said reverse side of said substrate to a principal surface of a support substrate, and thereafter removing said base substrate from said substrate.

2. The method of manufacturing an optical modulator according to claim 1, wherein said second machining process includes a grinding process using an outer circumferential blade.

3. The method of manufacturing an optical modulator according to claim 2, including the step of truing said outer circumferential blade to shape.

4. The method of manufacturing an optical modulator according to claim 1, wherein said support substrate has a groove, and said substrate and said support substrate are applied to each other such that said optical waveguide, said first thin-wall portion, and said second thin-wall portion are positioned within said groove.

5. The method of manufacturing an optical modulator according to claim 1, wherein said substrate is processed into a thin plate having a thickness ranging from 30 µm to 300 µm by said machining process.

6. The method of manufacturing an optical modulator according to claim 1, wherein said first thin-wall portion has a thickness ranging from 5 µm to 30 µm.

7. The method of manufacturing an optical modulator according to claim 1, wherein the difference between the thickness of said first thin-wall portion and the thickness of said second thin-wall portion is at least 1 µm.

8. The method of manufacturing an optical modulator according to claim 1, wherein said modulation electrodes include a central electrode having a width W and said modulation electrodes are spaced from each other by a distance G, said first thin-wall portion having a width ranging from (W+2 µm) to (W+2G).

* * * * *